US006543278B1

United States Patent
Kogure

(10) Patent No.: US 6,543,278 B1
(45) Date of Patent: Apr. 8, 2003

(54) APPARATUS FOR ESTIMATING ROAD FRICTION COEFFICIENT

(75) Inventor: Masaru Kogure, Mitaka (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/628,683

(22) Filed: Jul. 28, 2000

(51) Int. Cl.⁷ .................. G01M 17/02; G01N 19/02
(52) U.S. Cl. .................. 73/146; 73/9; 701/41; 701/89
(58) Field of Search .................. 73/146, 146.2, 73/9; 701/80, 74, 83, 82, 69, 88, 41, 89; 180/197

(56) References Cited

U.S. PATENT DOCUMENTS 5,365,439 A    11/1994   Momose et al.
5,742,917 A     4/1998   Matsumo 6,094,614 A   *   7/2000   Hiwatashi ..................... 701/89
6,324,461 B1 * 11/2001   Yamaguchi et al. .......... 701/80

FOREIGN PATENT DOCUMENTS

EP          0 444 772       9/1991

* cited by examiner

*Primary Examiner*—Harshad Patel
(74) *Attorney, Agent, or Firm*—Smith, Gambrell & Russell, LLP

(57) ABSTRACT

A friction coefficient on road is estimated for vehicles. An actual vehicle of a specific vehicle operating parameter is calculated. A first reference value of the vehicle operating parameter on a road with a large friction coefficient is calculated based on vehicle operating model for the road with the large friction coefficient. A second reference value of the vehicle operating parameter on a road with a small friction coefficient is calculated based on vehicle operating model for the road with the small friction coefficient. A friction coefficient on road is estimated based on the relationship between the actual value and the first and the second reference values.

12 Claims, 8 Drawing Sheets

APPARATUS FOR ESTIMATING ROAD FRICTION COEFFICIENT

BACKGROUND OF THE INVENTION

The present invention relates to an apparatus for estimating coefficients of friction on road for vehicles in a wide vehicle operating range.

Several techniques of controlling vehicles, such as, traction control, braking control and torque distribution control, have been proposed and advanced.

Accurate estimation of road friction coefficients is essential for control parameter calculations and adjustments in these control techniques.

The inventor of the present invention has proposed a technique of estimating road friction coefficients in Japanese Un examined Patent Publication No. 2000-71968.

In this technique, reference vehicle slip angles by vehicle operating model on high and low friction coefficient-roads are calculated. Also calculated is an estimated vehicle slip angle by an observer formed by vehicle operating model. These reference vehicle slip angles on high and low friction coefficient-roads and estimated vehicle slip angle are used for estimating road friction coefficients.

This road friction coefficient estimation technique uses a slip angle for which steering response will largely vary according to road friction coefficients.

This technique performs accurate road friction coefficient estimation even in a small steering range in which such estimation would be difficult.

On the other hand, the estimation technique obtains vehicle slip angles by integration for road friction coefficient estimation, which have cumulative errors by repeated calculation, thus resulting in inaccurate road friction coefficient estimation.

Moreover, vehicle slip angles vary according to disturbances due to their very small values; and it has been considered that such slip angles are not appropriate as parameters for detecting minute changes in vehicles according to road conditions.

Furthermore, this estimation performs vehicle operation comparison using cornering forces that vary according to road friction coefficients. Vehicle slip angles are values that vary due to generation of cornering forces, but also vary due to geometrical conditions; and hence have weak relationships with cornering forces. This results in narrow estimation range. Actually, usual steering at a speed in the range of 40 to 50 km/h will generate almost zero for a vehicle slip angle. This makes slip angle estimation almost impossible by parameter comparison.

Moreover, bad road conditions would generate phase inversion or phase delay for vehicle slip angles. Such phase inversion or delay could cause erroneous judgements for vehicle slip angle estimation by angle value comparison.

SUMMARY OF THE INVENTION

A purpose of the present invention is to provide an apparatus for accurately estimating vehicle slip angles in a wide range with no cumulative errors, little effect of disturbances and small phase delays.

The present invention provides an apparatus for estimating a friction coefficient on road for vehicles, the apparatus including: an actual value calculator to calculate an actual value of a specific vehicle operating parameter; a first reference value calculator to calculate a first reference value of the vehicle operation parameter on a road with a large friction coefficient based on vehicle operating model for the road with the large friction coefficient; a second reference value calculator to calculate a second reference value of the vehicle operating parameter on a road with a small friction coefficient based on vehicle operating model for the road with the small friction coefficient, and an estimator to estimate a friction coefficient on road based on the relationship between the actual value and the first and the second reference values.

Furthermore, the present invention provides an apparatus for estimating a friction coefficient on road for vehicles, the apparatus including: an actual value calculator to calculate an actual vehicle of yaw rate or lateral acceleration and another actual value of a front wheel slip angle; a first reference value calculator to calculate a first reference value of the yaw rate or the lateral acceleration and a second reference value of the front wheel slip angle on a road with a large friction coefficient based on vehicle operating model for the road with the large friction coefficient; a second reference value calculator to calculate a third reference value of the yaw rate or the lateral acceleration and a fourth reference value of the front wheel slip angle on a road with a small friction coefficient based on vehicle operating model for the road with the small friction coefficient; and an estimator to estimate a first friction coefficient on road based on the relationship between the actual value and the first reference value on the road with the large friction coefficient and the third reference value on the road with the small friction coefficient, and a second friction coefficient on road based on the relationship between the actual value and the second reference value on the road with the large friction coefficient and the fourth reference value on the road with the small friction coefficient, either the first or the second friction coefficient being employed according to predetermined requirements.

Moreover, the present invention provides an apparatus for estimating coefficients of friction on road for vehicles, the apparatus including: an actual value calculator to calculate an actual value of a front wheel slip angle; a first reference value calculator to calculate a first reference value of the front wheel slip angle on a road with a large function coefficient based on vehicle operating model for the road with the large friction coefficient, a second reference value calculator to calculate a second reference value of the front wheel slip angle on a road with a small friction coefficient based on vehicle operating model for the road with the small friction coefficient; and an estimator to estimate a friction coefficient on road based on the relationship between the actual value with the first and the second reference values.

DETAILED DESCRIPTION OF PREFERRED EMBODIMENTS

Preferred embodiments according to the present invention will be disclosed with reference to the attached drawings.

Figure 1:
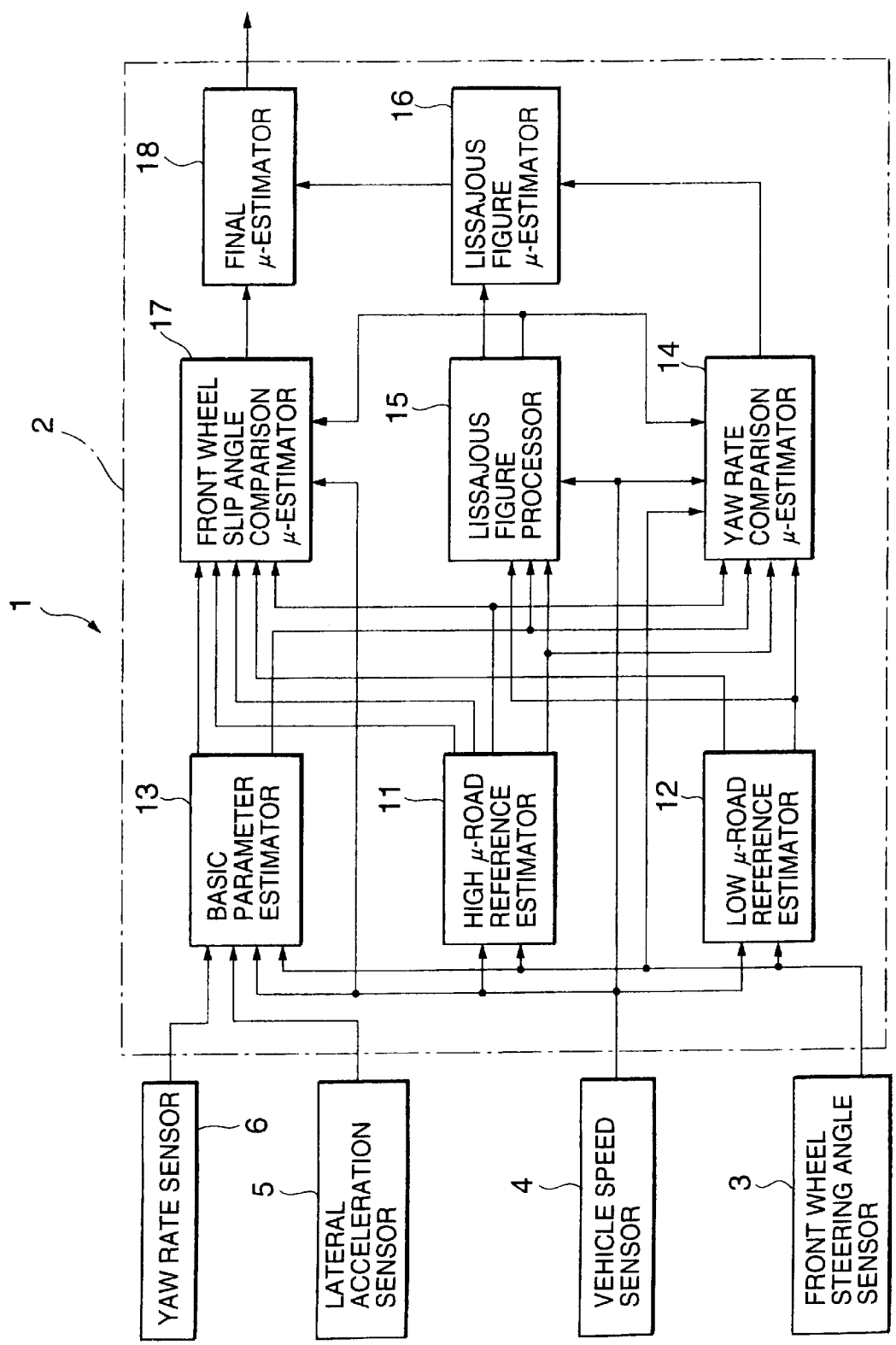
FIG. 1 shows a block diagram of a preferred embodiment of a vehicle road friction coefficient estimating apparatus according to the present invention.

A vehicle road friction coefficient estimating apparatus shown in FIG. 1 is provided with a controller 2. Connected to the controller 2 are sensors for vehicle operating conditions, such as, a front wheel steering angle sensor 3, a vehicle speed sensor 4, a lateral acceleration sensor 5 and a yaw rate sensor 6.

Values input to these sensors are a front wheel steering angle $f_S$, a vehicle speed $V_S$, lateral acceleration $(d^2y/dt^2)_S$, and a yaw rate (yaw angular velocity) $(d\psi/dt)_S$. The suffix "$_S$" added to each parameter indicates that these values are input to the sensors.

The controller 2 is provided with a high $\mu$-road reference estimator 11 for estimating reference parameters on road with a high (or a large) friction coefficient ($\mu$), a low $\mu$-road reference estimator 12 for estimating reference parameters on road with a low (or a small) friction coefficient, a basic parameter estimator 13, a yaw rate comparison $\mu$-estimator 14, a Lissajous figure processor 15, a Lissajous figure $\mu$-estimator 16, a front wheel slip angle comparison $\mu$-estimator 17, and a final $\mu$-estimator 18. The letter "$\mu$" means a road friction coefficient. A road with a high or low friction coefficient is expressed as a high or low $\mu$-road.

In operation, a front wheel steering angle $\delta fs$ and a vehicle speed Vs are supplied to the high $\mu$-road reference estimator 11 from the front wheel steering angle sensor 3 and the vehicle speed sensor 4, respectively.

The estimator 11 estimates and calculates a yaw rate corresponding to the angle $\delta fs$ and speed Vs as a high $\mu$-reference yaw rate $(d\psi/dt)_H$ by a vehicle operating model based on equation of motion for vehicles on a road with a large friction coefficient. The suffix "$_H$" means a high $\mu$-road reference parameter for a road with a high (large) friction coefficient.

The high $\mu$-reference yaw rate $(d\psi/dt)_H$ is supplied to the yaw rate comparison $\mu$-estimator 14 and the Lissajous figure processor 15.

In addition to the high $\mu$-road reference yaw rate $(d\psi/dt)_H$, also output by the high $\mu$-road reference estimator 11 are a yaw angular acceleration $(d^2\psi/dt^2)_H$, a front wheel slip angle $\beta f_H$, a vehicle slip angular velocity $(d\beta/dt)_H$, and a lateral acceleration $(d^2y/dt^2)_H$.

The yaw angular acceleration $(d^2\psi/dt^2)_H$ is supplied to the yaw rate comparison $\mu$-estimator 14 and the Lissajous figure processor 15. The front wheel slip angle $\beta f_H$ is supplied to the front wheel slip angle comparison $\mu$-estimator 17. Also supplied to the estimator 17 is the vehicle slip angular velocity $(d\beta/dt)_H$. The lateral acceleration $(d^2y/dt^2)_H$ is supplied to the yaw rate comparison $\mu$-estimator 14 and the front wheel slip angle comparison $\mu$-estimator 17.

The front wheel steering angle $\delta fs$ and a vehicle speed Vs are also supplied to the low $\mu$-road reference estimator 12 from the front wheel steering angle sensor 3 and the vehicle speed sensor 4, respectively.

The estimator 12 estimates and calculates a yaw rate corresponding to the angle $\delta fs$ and speed Vs as a low $\mu$-road reference yaw rate $(d\psi/dt)_L$ by a vehicle operating model based on equation of motion for vehicles on a road with a small friction coefficient. The suffix "$_L$" means a low $\mu$-road reference parameter for a road with a low (small) friction coefficient.

The low $\mu$-road reference yaw rate $(d\psi/dt)_L$ is supplied to the yaw rate comparison $\mu$-estimator 14 and the Lissajous figure processor 15.

In addition to the low $\mu$-road reference yaw rate $(d\psi/dt)_L$, also output by the low $\mu$-road reference estimator 12 are a yaw angular acceleration $(d^2\psi/dt^2)_L$ and a front wheel slip angle $\beta f_L$.

The yaw angular acceleration $(d^2\psi/dt^2)_L$ is supplied to the yaw rate comparison $\mu$-estimator 14 and the Lissajous figure processor 15. The front wheel slip angle $\beta f_L$ is supplied to the front wheel slip angle comparison $\mu$-estimator 17.

Figure 2:
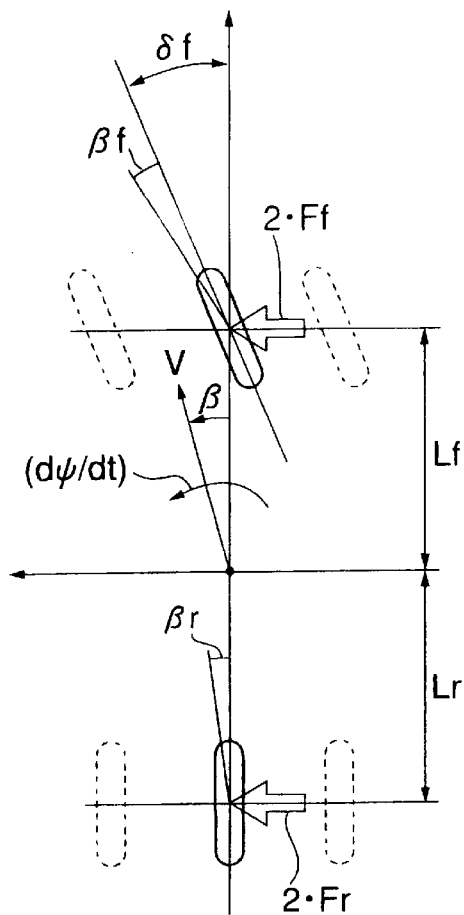
FIG. 2 illustrates vehicle operation model of a two-wheel vehicle equivalent to a four-wheel vehicle.

Discussed with reference to FIG. 2 are the vehicle operation model used by the high $\mu$-road reference estimator 11 and the low $\mu$-road reference estimator 12, and parameter calculation.

The equation of motion for movement of a vehicle in the lateral direction is expressed by the following equation (1):

$$M \cdot (d^2y/dt^2) = 2 \cdot Ft + 2 \cdot Fr \tag{1}$$

where Ft and Fr indicate cornering forces (per wheel) generated for front and rear wheels, respectively, M a mass of vehicle, and $(d^2y/dt^2)$ lateral acceleration.

The equation of motion for rotational movement of a vehicle around the center of mass, is expressed by the following equation (2):

$$Iz \cdot (d^2\psi/dt^2) = 2 \cdot Ff \cdot Lf - 2 \cdot Fr \cdot Lr \tag{2}$$

where Lf and Lr indicate the distances between the center of mass to the front and rear wheel-shafts, respectively, Iz vehicle yawing moment of inertia, and $(d^2\psi/dt^2)$ yaw angular acceleration.

The lateral acceleration $(d^2y/dt^2)$ is expressed by the following equation (3):

$$(d^2y/dt^2) = V \cdot ((d\beta/dt) + (d\psi/dt)) \tag{3}$$

where $\beta$ indicates a vehicle slip angle and $(d\beta/dt)$ vehicle slip angle velocity.

Cornering forces response like a primary delay to lateral slip angles of tyres. The following equations (4) and (5) are however obtained by linearization using equivalent cornering forces for which the suspension characteristics is taken into tyre characteristics with ignoring such delay in response.

$$Ff = -Kf \cdot \beta f \tag{4}$$

$$Fr = -Kr \cdot \beta r \tag{5}$$

where Kf and Kr indicate equivalent cornering forces generated for the front and rear tyres, respectively, and $\beta f$ and $\beta r$ lateral slip angles of the front and rear tyres, respectively.

The lateral slip angles $\beta f$ and $\beta r$ can be simplified as the following equations (6) and (7) by using the equivalent cornering forces Kf and Kr under consideration of effects of rolling and suspension:

$$\beta f = \beta + Lf \cdot (d\psi/dt)/V - \delta f \tag{6}$$

$$\beta r = \beta - Lr \cdot (d\psi/dt)/V \tag{7}$$

where $\delta f$ indicates a front wheel steering angle.

The following conditional equations are obtained by the equations of motion described above.

$$(dx(t)/dt) = A \cdot x(t) + B \cdot u(t) \tag{8}$$

$$x(t) = [\beta (d\psi/dt)]^T$$

$$u(t) = [\beta f 0]^T$$

$$A = \begin{bmatrix} a11 & a12 \\ a21 & a22 \end{bmatrix}$$

$$B = \begin{bmatrix} b11 & b12 \\ b21 & b22 \end{bmatrix}$$

$$a11 = -2 \cdot (Kf + Kr)/(M \cdot V)$$

$$a12 = -1 - 2 \cdot (Lf \cdot Kf - Lr \cdot Kr)/(M \cdot V^2)$$

$$a21 = -2 \cdot (Lf \cdot Kf - Lr \cdot Kr)/Iz$$

$$a22 = -2 \cdot (Lf^2 \cdot Kf + Lr^2 \cdot Kr)/(Iz \cdot V)$$

$$b11 = 2 \cdot Kf/(M \cdot V)$$

$$b21 = 2 \cdot Lf \cdot Kf/Iz$$

$$b12 = b22 = 0$$

The high $\mu$-road reference estimator 11 pre-stores equivalent cornering forces Kf and Kr at $\mu=1.0$, for example, for the equation (8) to calculate $(dx(t)/dt) = [(d\beta/dt\ (d^2\psi/dt^2)]^T$ under vehicle operating conditions (a vehicle speed $V_S$ and a front wheel steering angle ($\delta f_S$) for obtaining a high $\mu$-road reference vehicle slip angular velocity $(d\beta/dt)_H$ and a high $\mu$-road reference yaw angular acceleration $(d^2\psi/dt^2)_H$.

The high $\mu$-road reference vehicle slip angular velocity $(d\beta/dt)_H$ and yaw angular acceleration $(d^2\psi/dt^2)_H$ are integrated to obtain a high $\mu$-road reference vehicle slip angle $\beta_H$ and a high $\mu$-road reference yaw rate $(d\psi/dt)_H$.

Substitution of $\beta_H$ and $(d\psi/dt)_H$ for $\beta$ and $(d\psi/dt)$, respectively, in the equation (6) obtains a high $\mu$-road reference front steering wheel slip angle $\beta_{fH}$.

Substitution of the high $\mu$-road reference vehicle slip angular velocity $(d\beta/dt)_H$ and yaw rate $(d\psi/dt)_H$ for $(d\beta/dt)$ and $(d\psi/dt)$, respectively, in the equation (3) obtains a high $\mu$-road reference lateral acceleration $(d^2y/dt^2)_H$.

In the same way, the high $\mu$-road reference estimator 12 pre-stores equivalent cornering forces Kf and Kr at $\mu=0.3$, for example, for the equation (8) to calculate $(dx(t)/dt) = [(d\beta/dt\ (d^2\psi/dt^2)]^T$ under vehicle operating conditions (a vehicle speed $V_S$ and a front wheel steering angle $\delta f_S$) for obtaining a low $\mu$-road reference vehicle slip angular velocity $(d\beta/dt)_L$ and a low $\mu$-road reference yaw angular acceleration $(d^2\psi/dt^2)_L$.

The low $\mu$-road reference vehicle slip angular velocity $(d\beta/dt)_L$ and yaw angular acceleration $(d^2\psi/dt^2)_L$ are integrated to obtain a low $\mu$-road reference vehicle slip angle $\beta_L$ and a low $\mu$-road reference yaw rate $(d\psi/dt)_L$.

Substitution of $\beta_L$ and $(d\psi/dt)_L$ for $\beta$ and $(d\psi/dt)$, respectively, in the equation (6) obtains a low $\mu$-road reference front steering wheel slip angle $\beta_{fL}$.

The basic parameter estimator 13 receives the vehicle speed $V_S$, the front wheel steering angle $\delta f_S$, the lateral acceleration $(d^2y/dt^2)_S$, and the yaw rate $(d\psi/dt)_S$ to estimate and calculate a yaw rate as a basic yaw rate $(d\psi/dt)_O$ with feeding back of actual vehicle movements. The basic parameter estimator 13 is an observer formed by vehicle operating model.

The estimated and calculated basic yaw rate $(d\psi/dt)_O$ and also a basic yaw angular acceleration $(d^2y/dt^2)_O$ are supplied to the yaw rate comparison $\mu$-estimator 14 and the Lissajous figure processor 15.

The basic parameter estimator 13 also calculates a front wheel steering slip angle as a basic front wheel steering slip angle $\beta f_O$ which is supplied to the front wheel slip angle comparison $\mu$-estimator 17.

The suffix "$_O$" added to each parameter output by the basic parameter estimator 13 indicates that the parameter is output from the observer.

Figure 3:
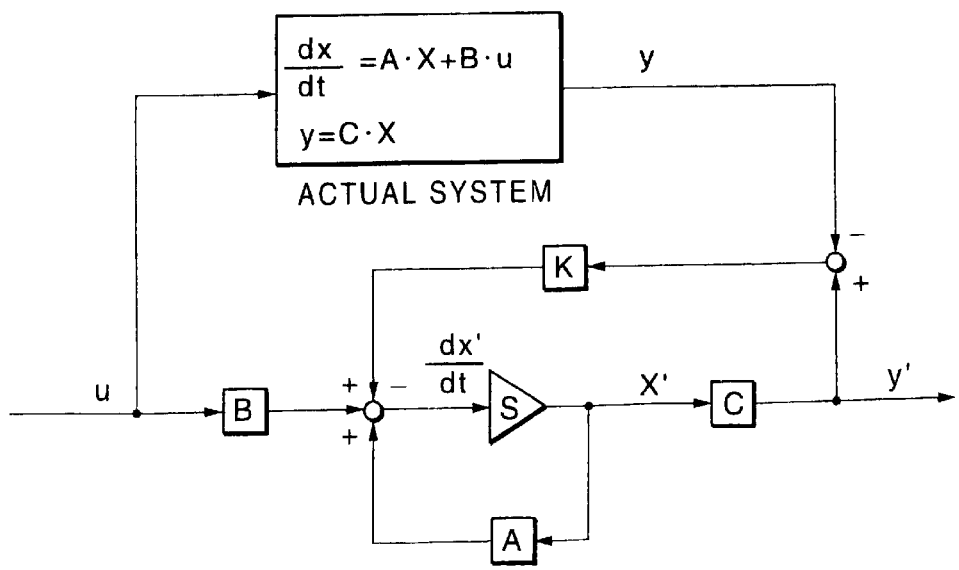
FIG. 3 explains an observer.

The observer is disclosed with reference to FIG. 3.

When an output which can be measured or detected by a sensor is expressed as:

$$y(t) = C \cdot x(t) \tag{9}$$

the observer can be expressed as follows:

$$(dx'(t)/dt) = (A - K \cdot C) \cdot x'(t) + K \cdot y(t) + B \cdot u(t) \tag{10}$$

The observer is applied to vehicle operating model.

The parameter x(t) is a state variable vector (the suffix "'" indicating an estimated value), the parameter u(t) is an input vector, and A and B are coefficient matrices for a state equation and which correspond to the coefficient matrices described above.

The parameter y(t) is a measurable sensor output vector expressed as $y(t) = [\beta_S (d\psi/dt)_S]^T$. A vehicle slip angle $\beta_S$ is obtained by integrating a vehicle slip angular velocity $(d\beta/dt)_S$ which is obtained based on a lateral acceleration $(d^2y/dt^2)$ and a yaw rate $(d\psi/dt)_S$ both detected by sensors according to the equation (3).

The letter C in the equation (10) is a matrix (a unit matrix in the embodiment) that indicates the relationship between sensor outputs and state variables.

The letter K in the equation (10) is a feedback gain matrix which can be set freely and expressed as follows:

$$C = \begin{bmatrix} 1 & 0 \\ 0 & 1 \end{bmatrix}$$

$$B = \begin{bmatrix} k11 & k12 \\ k21 & k22 \end{bmatrix}$$

According to these relationships, the observer estimates and calculates a basic yaw angular acceleration $(d^2y/dt^2)$ and a basic vehicle slip angular velocity $(d\beta/dt)_O$ as the following equations:

$$(d^2\psi/dt^2)_O = a11 \cdot (d\psi/dt)_O + a12 \cdot \beta_O + b11 \cdot \delta f_S + k11 \cdot ((d\psi/dt)_S - (d\psi/dt)_O) + k12 \cdot (\beta_S - \beta_O) \tag{11}$$

$$(d\beta/dt)_O = a21 \cdot (d\psi/dt)_O + a22 \cdot \beta_O + k21 \cdot ((d\psi/dt)_S - (d/dt)_O) + k22 \cdot ((\beta_S - \beta_O) \tag{12}$$

The basic yaw angular acceleration $(d^2y/dt^2)$ and the basic vehicle slip angular velocity $(d\beta/dt)_O$ calculated as above are integrated to obtain a basic yaw rate $(d\psi/dt)_O$ and a basic vehicle slip angle $\beta_O$.

The obtained basic yaw rate $(d\psi/dt)_O$ and vehicle slip angle $\beta_O$ are substituted for $(d\psi/dt)$ and $\beta$, respectively, in the equation (6) to calculate a basic front wheel slip angle $\beta f_O$.

The high $\mu$-road reference estimator 11, the low $\mu$-road reference estimator 12, and the basic parameter estimator 13 cannot perform calculation at a vehicle speed $V_S=0$ because such calculation will be division using zero as a divisor.

For this reason, sensor output values are used as a yaw rate and a lateral acceleration at an extremely slow speed (such as, slower than 10 km/h), that is, $$(d\psi/dt)_H=(d\psi/dt)_L=(d\psi/dt)_O=(d\psi/dt)_S (d^2y/dt^2)_O=(d^2y/dt^2)_S$$

A vehicle slip angle is determined as shown below based on a geometrical relationship for normal circular steering.

$$\beta_H=\beta_{L-\beta O}=f_S \cdot (Lf+Lr)$$

Front wheel slip angles are all zero due to no generation of cornering forces, that is, $$\beta f_H=\beta f_L=\beta f_O=0$$

Supplied to the yaw rate comparison $\mu$-estimator 14 are vehicle speed $V_S$, a sensor value of front wheel steering angle $f_S$, a high $\mu$-road reference yaw rate $(d\psi/dt)_H$, yaw angular acceleration $(d^2\psi/dt^2)_H$, lateral acceleration $(d^2/dt^2)_H$, a low $\mu$-road reference yaw rate $(d\psi/dt)_L$, yaw angular acceleration $(d^2\psi/dt^2)_L$, a basic yaw rate $(d\psi/dt)_O$, and basic yaw angular acceleration $(d^2\psi/dt^2)_O$.

Also supplied to the yaw rate comparison $\mu$-estimator 14 from the Lissajous figure processor 15 are a high $\mu$-road side phase component $P_H$ and a low $\mu$-road side phase component $P_L$.

A new road friction coefficient $\mu\gamma n$ is calculated according to the equation (13) below based on a high $\mu$-road reference yaw rate $(d\psi/dt)_H$, a low $\mu$-road reference yaw rate $(d\psi/dt)_L$, and a basic yaw rate $(d\psi/dt)_O$, when the execution requirements discussed later are met.

$$\mu\gamma n=((\mu_H-\mu_L)\cdot (d\psi/dt)_O+\mu_L\cdot (d\psi/dt)_H-\mu_H\cdot (d\psi/dt)_L)/((d\psi/dt)_H-(d\psi/dt)_L) \quad (13)$$

In the equation (13), the sign "$\mu_H$" represents a road friction coefficient, such as, 1.0, that has been estimated by the high $\mu$-road reference estimator 11; and the sign "$\mu_L$" represents a road friction coefficient, such as, 0.3, that has been estimated by the low $\mu$-road reference estimator 12.

Linear functions is formed by high and low $\mu$-road reference yaw rates $(d\psi/dt)_H$ and $(d\psi/dt)_L$ in the equation (13) and a basic yaw rate $(d\psi/dt)_O$ is introduced into the linear functions to obtain a new road friction coefficient $\mu\gamma n$. This new coefficient should be a value in the range of an upper value, such as, 1.0 to a lower value that is accurately obtained on a low-$\mu$ road.

The difference between the present road friction coefficient $\mu\gamma n$ and the preceding road friction coefficient A $\gamma n-1$ that is an increase is added to the preceding road friction coefficient $\mu\gamma n-1$ (weightedmean) according to the equation (14) to calculate a road friction coefficient $\mu\gamma$ (by yaw rate comparison) which is then supplied to the Lissajous figure $\mu$-estimator 16.

$$\mu\gamma=\mu\gamma n-1+k1\cdot (\mu\gamma n-\mu\gamma n-1) \quad (14)$$

In this equation, "k1" is decided as shown below under consideration in that a very reliable estimated value is obtained as the difference between the high and low $\mu$-road reference yaw rates $(d\psi/dt)_H$ and $(d\psi/dt)_L$ becomes large.

$$k1=0.3\cdot |(d\psi/dt)_H-(d\psi/dt)_L|/|(d\psi/dt)_H| \quad (15)$$

The following requirements are predetermined for the yaw rate comparison $\mu$-estimator 14 in calculation of a road friction coefficient $\mu\gamma r$.

(1-1)

An assumption is made such that a vehicle that is originally a multi-degree-of-freedom system is treated as a two-wheel model by approximation with secondary-degree-of-freedom system of lateral movement and movement around the vertical axis. Thus, no calculation is performed at a low speed or a wide steering angle at which there is a big difference between an actual vehicle and the two-wheel model. For example, no calculation is performed at a speed slower than 10 km/h or the absolute value of a front wheel steering angle $\delta f_S$ is larger than 500 deg.

(1-2)

No calculation is performed at a small yaw rate absolute value to which sensor electrical noises or disturbances are relatively large. For example, no calculation is performed at the absolute value of a basic yaw rate $(d\psi/dt)_O$ is smaller than 1.5 deg/s.

(1-3)

No calculation is performed at a small cornering force to which sensor electrical noises or disturbances are relatively large, or a small lateral acceleration absolute value proportion to the cornering force due to road friction coefficient estimation using difference in cornering force according to road friction coefficients. For example, no calculation is performed at the absolute value of a high $\mu$-road reference lateral acceleration $(d^2y/dt^2)_H$ is smaller than 0.15 G.

(1-4)

A yaw rate response to steering angle would vary and delay according to road friction coefficients. The delay produces a large error for estimation of road friction coefficient. No calculation is thus not performed for a large delay or error, for example, for large delay due to large high and low $\mu$-road side phase components $P_H$ and $P_L$. Moreover, no calculation is performed for large errors due to delay caused by other than at a rising edge of yaw rate. This rising edge is detected by (yaw rate)·(yaw angular acceleration).

(1-5)

No calculation is performed at the absolute value of the difference between high and low $\mu$-road reference yaw rates when not so large to sensor electrical noises or disturbances. For example, no calculation is performed when the absolute value of the difference between high and low $\mu$-road reference yaw rates $(d\psi/dt)_H$ and $(d\psi/dt)_L$ is smaller than 1 deg/s.

(1-6)

For avoiding division with the divisor zero in the equation (15), no operation is performed, for example, when the absolute value of the difference between high and low $\mu$-road reference yaw rates $(d\psi/dt)_H$ and $(d\psi/dt)_L$ is smaller than 1 deg/s.

As disclosed above, according to this embodiment, road friction coefficient estimation uses yaw rates not vehicle slip angles because of the following reasons. Variation in yaw rate is larger than that in vehicle slip angle. Yaw rate sensor outputs are very accurate for yaw rate estimation. Phase delay in yaw rate is smaller than that in vehicle slip angle. Moreover, yaw rates produce no cumulative errors against disturbances.

Not only yaw rates but also lateral acceleration can be used for accurate road friction coefficient estimation. The road friction coefficient estimation uses basic lateral acceleration estimated by high and low $\mu$-road reference lateral acceleration and an observer. Road friction coefficient estimation with lateral acceleration is almost the same as that with yaw rate in procedure; and hence its disclosure is omitted.

As disclosed above, the yaw rate comparison $\mu$-estimator does not perform road friction coefficient estimation so often when produces large errors due to, for example, delay in yaw rate response to steering angle.

Instead, the Lissajous figure processor 15 and the Lissajous figure $\mu$-estimator 16 perform road friction coefficient estimation by using Lissajous figures for delay in yar rate response.

In detail, the Lissajous figure processor 15 receives a vehicle speed $V_S$, a high $\mu$-road reference yaw rate $(d\psi/dt)_H$, yaw angular acceleration $(d^2y/dt^2)_H$, a low $\mu$-road reference yaw rate $(d\psi/dt)_L$, yaw angular acceleration $(d^2y/dt^2)_L$, a basic yaw rate $(d\psi/dt)_O$, basic yaw angular acceleration $(d^2y/dt^2)_O$.

The Lissajous figure processor 15 forms a Lissajous figure based on the basic yaw rate $(d\psi/dt)_O$ and the high $\mu$-road reference yaw rate $(d\psi/dt)_H$. An area of the Lissajous figure is calculated as a high $\mu$-road side Lissajous figure area $S_H$ which is then supplied to the Lissajous figure $\mu$-estimator 16.

The Lissajous figure processor 15 further forms another Lissajous figure based on the basic yaw rate $(d\psi/dt)_O$ and the low $\mu$-road reference yaw rate $(d\psi/dt)_L$. An area of the Lissajous figure is calculated as a low $\mu$-road side Lissajous figure area $S_L$ which is also supplied to the Lissajous figure $\mu$-estimator 16.

Moreover, the Lissajous figure processor 15 calculates phase components that correspond to delay in two parameters for forming Lissajous figures, that is, a high $\mu$-road side phase component $P_H$ obtained from the high $\mu$-road side Lissajous figure and a low $\mu$-road side phase component $P_L$ obtained from the low $\mu$-road side Lissajous figure. These components $P_H$ and $P_L$ are supplied to the yaw rate comparison $\mu$-estimator 14 and the front wheel slip angle comparison $\mu$-estimator 17.

Delay in yaw rate against steering angle will be small for high $\mu$-road driving while large for low $\mu$-road driving. Real time-delay calculation is almost impossible; and hence the Lissajous figure processor 15 obtains Lissajous figure areas and the Lissajous figures $\mu$-estimator 16 compares the Lissajous figure areas including delays, to obtain an accurate road friction coefficient.

Figure 4:
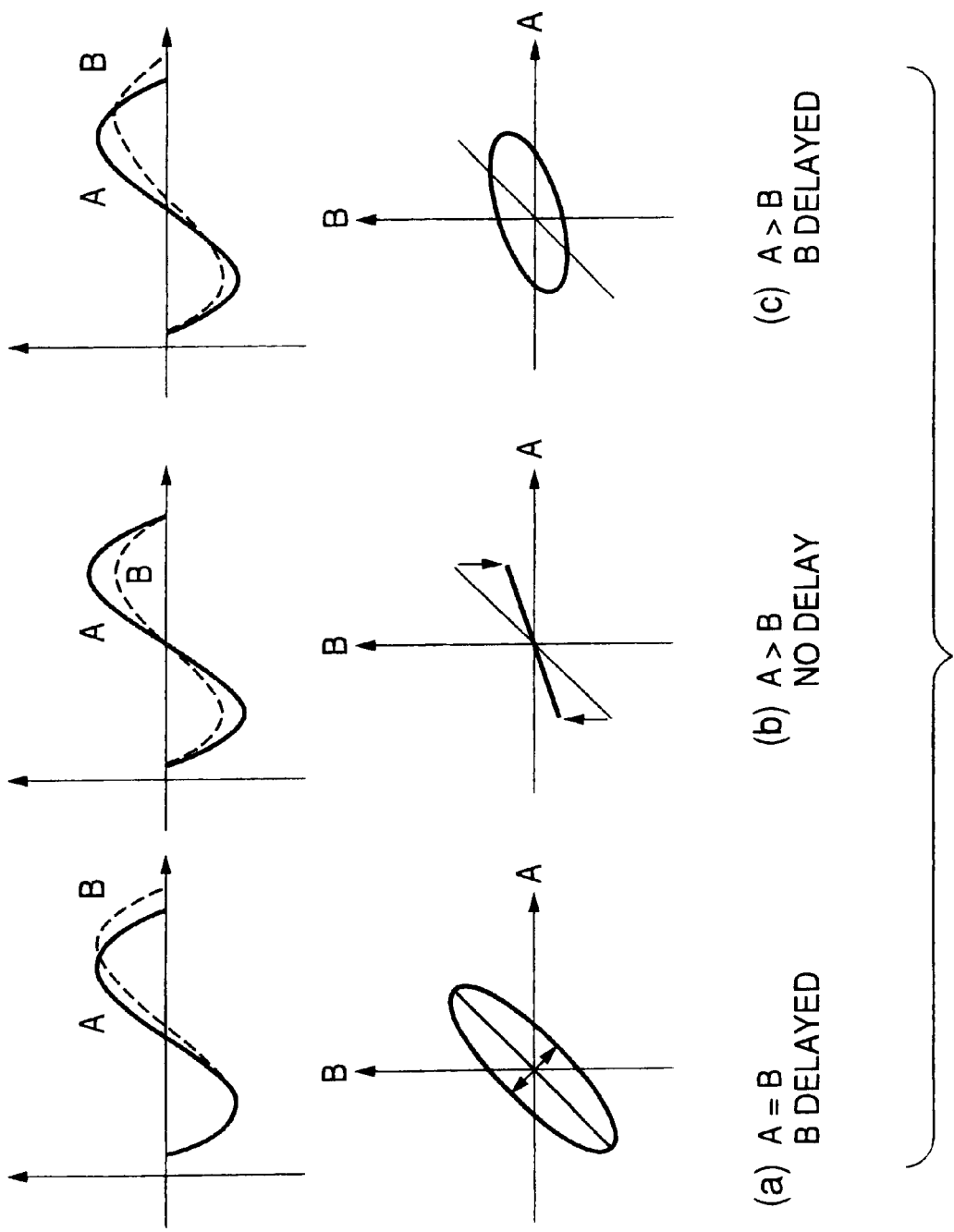
FIG. 4 explains calculation of areas of Lissajous figures drawn by two waves.

As shown in FIG. 4, a Lissajous figure formed by sine wave signals A and B will have a large area when there is a delay between the signals.

Figure 5:
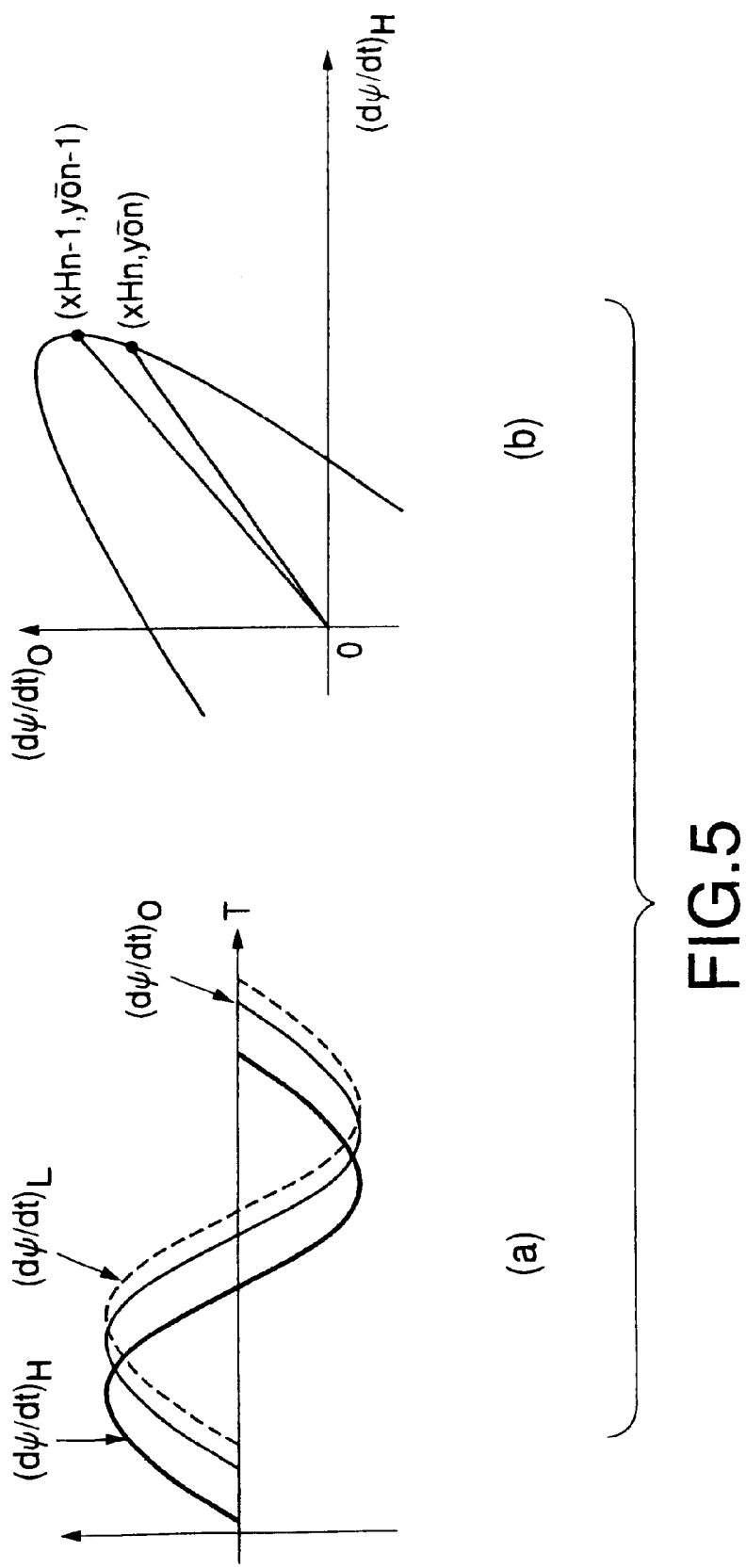
FIG. 5 explains Lissajous figures drawn by two waves.

For this reason, at yaw rates $(d\psi/dt)_O$, $(d\psi/dt)_H$ and $(d\psi/dt)_L$, as shown in (a) of FIG. 5, a high $\mu$-road side Lissajous figure $S_H$ formed by a basic $(d\psi/dt)_O$ and a high $\mu$-road reference yaw rate $(d\psi/dt)_H$ and a low $\mu$-road side Lissajous figure $S_L$ formed by the basic $(d\psi/dt)_O$ and a low $\mu$-road reference yaw rate $(d\psi/dt)_L$ are compared to each other to determine whether a road friction coefficient is large or small.

The Lissajous figure processor 15 obtains as shown in (b) of FIG. 5, a high $\mu$-road side Lissajous figure $S_H$ or a low $\mu$-road side Lissajous figure $S_L$ by integrating a minute triangular area, for example.

In detail, for high $\mu$-road side Lissajous figure $S^H$ calculation, a minute triangular area $\Delta S_H$ of a high $\mu$-road side Lissajous figure $S_H$ is calculated by as follows:

$$\Delta S_H = (\tfrac{1}{2}) \cdot |x_{Hn-1} \cdot (dy_{On-1}/dt) - Y_{On-1} \cdot (dx_{Hn-1}/dt)| \Delta t \qquad (16)$$

where $(x_{Hn-1}, y_{On-1})$ precede $(x_{Hn}, y_{On})$ by one cycle ($\Delta t = 10$ ms).

Calculation of a high $\mu$-road side Lissajous figure $S_H$ or a low $\mu$-road side Lissajous figure $S_L$ will not be executed (initialized) when a vehicle speed Vs is slower than 10 km/h or a basic yaw rate $(d\psi/dt)_O$ is smaller than 1.5 deg/s, for example.

The Lissajous figure processor 15 performs calculation of high and low $\mu$-road side phase components $P_H$ and $P_L$ according to the following equations:

$$P_H = \Delta S_H / (|x_{Hn-1}| \cdot |y_{On-1}|) \qquad (17)$$

$$P_L = \Delta S_L / (|x_{Ln-1}| \cdot |y_{On-1}|) \qquad (18)$$

The Lissajous figure $\mu$-estimator 16 estimates the present road friction coefficient $\mu_n$ by adjusting a road friction coefficient $\mu_{n-1}$ that has been adjusted so far when no calculation of a road friction coefficient $\mu\gamma$ is performed by the Lissajous figure $\mu$-estimator 16.

In detail, the present road friction coefficient $\mu_n$ is estimated as small for low $\mu$-road Lissajous processing which will be described later when a high $\mu$-road side Lissajous figure $S_H$ is very large compared to a low $\mu$-road side Lissajous figure $S_L$ ($S_H$ is larger than 105% of $S_L$, for example).

On the other hand, the present road friction coefficient $\mu_n$ is estimated as large for high $\mu$-road Lissajous processing which will be described later when a high $\mu$-road side Lissajous figure $S_H$ is small enough compared to a low $\mu$-road side Lissajous figure $S_L$ (105% of $S_H$ is smaller than $S_L$, for example).

The low $\mu$-road Lissajous processing is performed as follows:

A road friction coefficient $\mu_{n-1}$ that has been adjusted so far is adjusted to a small value by a large amount to estimate the present road friction coefficient $\mu$ for a low $\mu$-road side Lissajous figure $S_L$ because a large $S_L$ indicates a large delay and a high possibility of low $\mu$-road driving.

On the other hand, a road friction coefficient $\mu_{n-1}$ that has been adjusted so far is adjusted to a small value by a small amount to estimate the present road friction coefficient $\mu$ for a small low $\mu$-road side Lissajous figure $S_L$ because a small $S_L$ indicates a small delay and a high possibility of low $\mu$-road driving.

The high $\mu$-road Lissajous processing is performed as follows:

A road friction coefficient $\mu_{n-1}$ that has been adjusted so far is adjusted to a large value by a small amount to estimate the present road friction coefficient $\mu$ for a large high $\mu$-road side Lissajous figure $S_H$ because a large $S_H$ indicates a large delay and a high possibility of high $\mu$-road driving.

On the other hand, a road friction coefficient $\mu_{n-1}$ that has been adjusted so far is adjusted to a large value by a large amount to estimate the present road friction coefficient $\mu$ for a small high $\mu$-road side Lissajous figure $S_H$ because a small $S_H$ indicates a small delay and a high possibility of high $\mu$-road driving.

This embodiment includes the front wheel slip angle comparison $\mu$-estimator 17 for road friction coefficient estimation by using front wheel angles. The estimation with front wheel angles offers a fast response to quick steering, such as, lane change, even though at a small steering angle, which makes hard road friction coefficient $\mu\gamma$ estimation by comparison of yaw rates and also road friction coefficient $\mu_n$ by comparison of Lissajous figures.

The front wheel slip angle comparison $\mu$-estimator 17 receives a vehicle $V_S$, a high $\mu$-road reference front wheel slip angle $\beta f_H$, a vehicle slip angular velocity $(d\beta/dt)_H$, lateral acceleration $(d^2y/d^2t)$, a low $\mu$-road reference front wheel slip angle $\beta f_L$ and a basic front wheel slip angle $\beta f_O$.

Also supplied to the front wheel slip angle comparison $\mu$-estimator 17 are high and low $\mu$-road side phase components $P_H$ and $P_L$ from the Lissajous figure processor 15.

A new road friction coefficient $\mu \beta f_n$ is calculated according to the equation (19) by using the high and low $\mu$-road reference front wheel slip angles $\beta f_H$ and $\beta f_L$ and basic front wheel slip angle $\beta f_O$ when the execution requirements described later is met.

$$\mu \beta f_n = ((\mu_H - \mu_L) \cdot \beta f_O + \mu_L \cdot \beta f_H - \mu_H \cdot \beta f_L) / (\beta f_H - \beta f_L) \qquad (19)$$

The equation (19) corresponds to the equation (13); and hence, like the equation (13), linear functions is formed by the high and low μ-road reference front wheel slip angles $\beta f_H$ and $\beta f_L$ and a basic front wheel slip angle $\beta f_O$ is introduced into the equation (19) to obtain a new road friction coefficients $\mu\beta f_n$. The new road friction coefficient $\mu\beta f_n$ is filter a predetermined range for calculation of a road friction coefficient $\mu\beta f$ by front wheel slip angle comparison, which is then supplied to the final μ-estimator 18.

The following requirements are predetermined for the front wheel slip angle comparison μ-estimator 17 in calculation of a road friction coefficient $\mu\beta f$ by front wheel slip angle comparison.

(2-1)
No road friction coefficient estimation is performed at a low speed, for example, slower than 30 km/h.

(2-2)
No road friction coefficient estimation is performed when a basic front wheel slip angle $\beta f_O$ is out of the range, such as, of 0.5 to 5 deg, for avoiding a large error.

(2-3)
No road friction coefficient estimation is performed when the absolute value of lateral acceleration proportional to cornering forces is small, for example, the absolute value of high μ-road reference lateral acceleration $(d^2y/dt^2)_H$ is smaller than 0.2 G.

(2-4)
No road friction coefficient estimation is performed when the high and low μ-road reference front wheel slip angles $\beta f_H$ and $\beta f_L$, and basic front wheel slip angle $\beta f_O$ are all positive or negative due to relatively small delays between these slip angles.

(2-5)
No road friction coefficient estimation is performed when each front wheel slip angle is delayed by a large amount or a large error is expected due to delay. For example, no road friction coefficient estimation is performed when high and low μ-road side phase components $P_H$ and $P_L$ are large to produce a large delay.

(2-6)
No road friction coefficient estimation is performed when a ratio of a high μ-road front wheel slip angle, $\beta f_H$ to a low μ-road front wheel slip angle $\beta f_L$ goes beyond a preset range (for example, $\beta f_H / \beta f_L 22\ 1.05$) for avoiding a large error.

(2-7)
No road friction coefficient estimation is performed when the absolute value of the difference between high and low μ-road reference front wheel slip angles $\beta f_H$ and ) $\beta f_L$ is smaller than a preset value, such as, 0.1 deg, for avoiding a large error due to disturbances.

(2-8)
Road friction coefficient estimation is performed only when the absolute value of a high μ-road reference vehicle slip angular velocity $(d\beta/dt)_H$ is equal to or larger than 1 deg/s, for example, for quick steering, such as, lane change, even though at a small steering angle. This is because a big difference is often made between high and low μ-road reference front wheel slip angles $\beta f_H$ and $\beta f_L$ at a rising edge of a front wheel slip angle.

(2-9)
No road friction coefficient estimation is performed when a road friction coefficient $\mu\gamma$ has been estimated by yaw rate comparison or a road friction coefficient $\mu_n$ has been estimated by Lissajous figure comparison.

Accordingly, the embodiment offers a fast-responsive road friction coefficient setting in a wide range by using a front wheel slip angle as a fast-responsive parameter when no road friction coefficient is obtained by yaw rate comparison and also no road friction coefficient $\mu_n$ is estimated by Lissoajous figure comparison. Road friction coefficient setting by using a rear wheel slip angle also provides the same advantages.

As disclosed above, the road friction coefficient $\mu\gamma$ by yaw rate comparison, the road friction coefficient $\mu_n$ by Lissajous figure comparison, or the road friction coefficient $\mu\beta f$ by front wheel slip angle comparison is supplied to the final μ-estimator 18.

The final μ-estimator 18 outputs either of the input coefficients as a final present road friction coefficient.

In this embodiment, as disclosed, a road friction coefficient estimating means is constituted by the yaw rate comparison μ-estimator 14, the Lissajous figure processor 15, the Lissoajous figure μ-estimator 16, the front wheel slip angle comparison μ-estimator 17, and the finale μ-estimator 18.

The processing performed by the road friction coefficient estimating apparatus is explained with reference to the flow charts shown in FIGS. 6, 7 and 8.

The program shown in the flow charts is executed for each predetermined period, such as, 10 ms.

Figure 6:
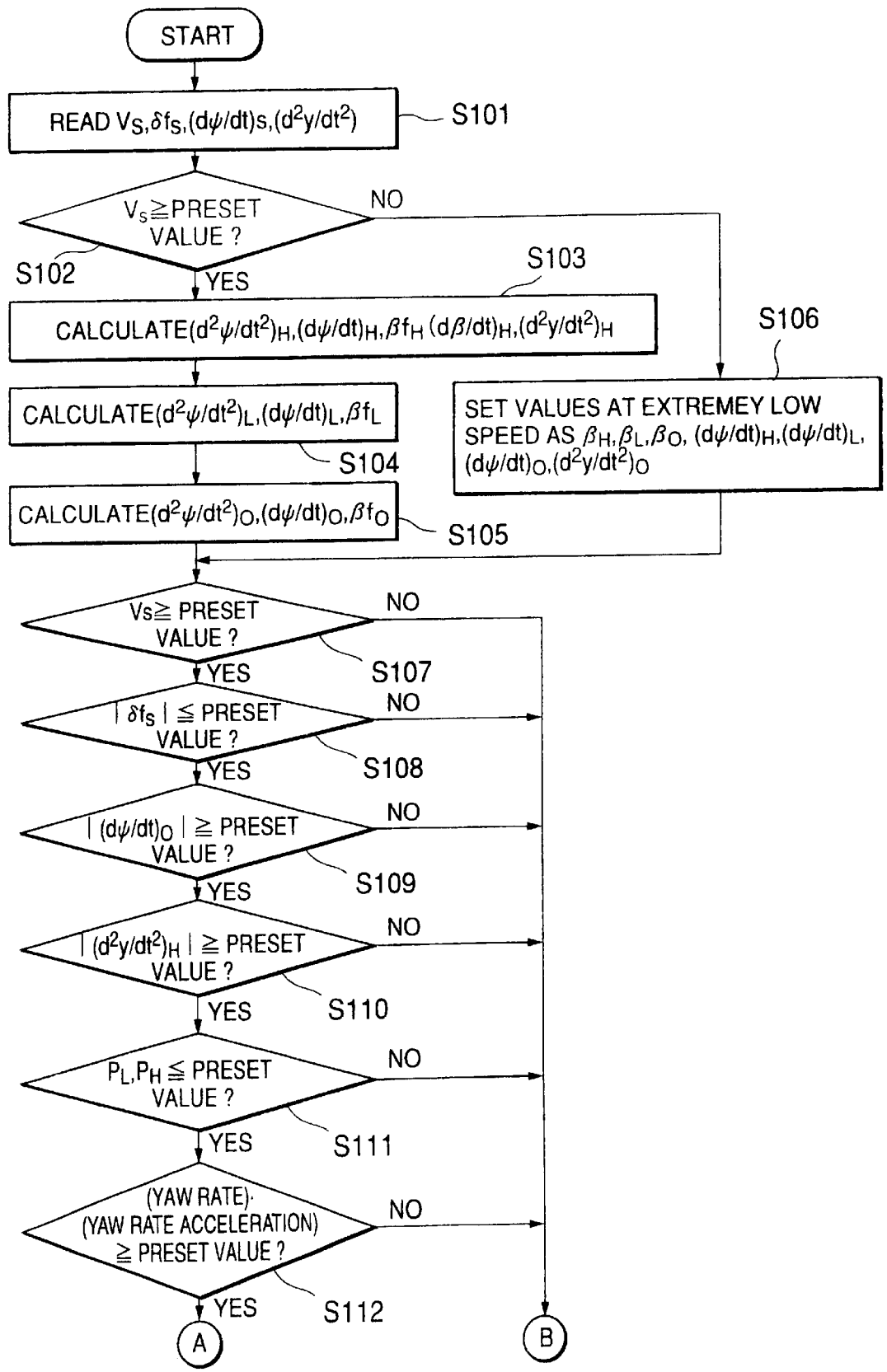
FIG. 6 is a flow chart for road friction coefficient estimation.

In FIG. 6, the road friction coefficient estimating apparatus receives a front wheel steering angle $\delta f_S$ from the front wheel steering sensor 3, a vehicle speed $V_S$ from the vehicle speed sensor 4, lateral acceleration $(d^2y/dt^2)_S$ from the lateral acceleration sensor 5, and a yaw rate $(d\psi/dt)_S$ from the yaw rate sensor 6 in STEP S101.

The process goes to STEP S102 to determine whether the vehicle speed $V_S$ is equal to or larger than a preset value, such as, 10 km/h. If yes, the process goes to STEPS S103, S104 and S105.

In STEP S103, the high μ-road reference estimator 11 calculates, by the high μ-road vehicle operating model, a high μ-reference yaw rate $(d\psi/dt)_H$ and high μ-reference yaw angular acceleration $(d^2\psi/dt^2)_H$, a front wheel slip angle $\beta f_H$, a vehicle slip angular velocity $(d\beta/dt)_H$, lateral acceleration $(dy^2/dt^2)_H$.

In STEP S104, the low μ-road reference estimator 12 calculates, by the low μ-road vehicle operating model, a low μ-reference yaw rate $(d\psi/dt)_L$, a low μ-reference yaw angular acceleration $(d^2\psi/dt^2)_L$ and a front wheel slip angle $\beta f_L$.

In STEP S105, the basic parameter estimator 13 calculates, by the observer formed by the vehicle operating model, a basic yaw rate $(d\psi/dt)_O$, basic yaw angular acceleration $(d^2\psi/dt^2)_O$, and a basic front wheel slip angle $\beta f_O$.

On the other hand, the process jumps onto STEP S106 from the STEP S102, when the vehicle speed $V_S$ is judged as smaller than the preset value.

In STEP S106, sensor values themselves or values obtained by geometrical calculation at an extremely low speed are set as the parameters, such as, vehicle slip angles $\beta_H$, $\beta_L$ and $\beta_O$, and yaw rates $(d\psi/dt)_H$, $(d\psi/dt)_L$ and $(d\psi/dt)_O$ and the lateral acceleration $(d^2y/dt^2)_O$.

The process goes to STEP S107 after STEPS S103, S104 and S105 or S106.

The judging processing in STEPS S107 to S115 is to determine whether the requirements is met for calculating a road friction coefficient $\mu\gamma$ by yaw rate comparison in the yaw rate comparison μ-estimator 14.

As disclosed in the requirements (1-1), it is determined whether the vehicle speed $V_S$ is equal to or larger than a preset value, such as, 10 km/h, in STEP S107, and whether the absolute value of the front wheel steering angle $\delta f_S$ is equal or smaller than a preset value, such as, 500 deg in STEP S108.

Next, as disclosed in the requirements (1-2), it is determined whether the absolute value of the basic yaw rate $(d\psi/dt)_O$ is equal to or larger than a preset value, such as, 1.5 deg/s, in STEP S109.

As disclosed in the requirements (1-3), it is determined whether the absolute value of the high μ-road reference lateral acceleration $(d^2y/d^2t)$, is equal to or larger than a preset value, such as, 0.15 G, in STEP S110.

As disclosed in the requirements (1-4), it is determined whether the high and low μ-road side phase components $P_H$ and $P_L$ are equal to or smaller than a preset value, such as, 0.06, in STEP S111; and also it is determined whether each (yaw rate) (yaw angular acceleration) is equal to or larger than a preset value, such as, −0.15 $deg^2/s^3$, in STEP S112.

Figure 7:
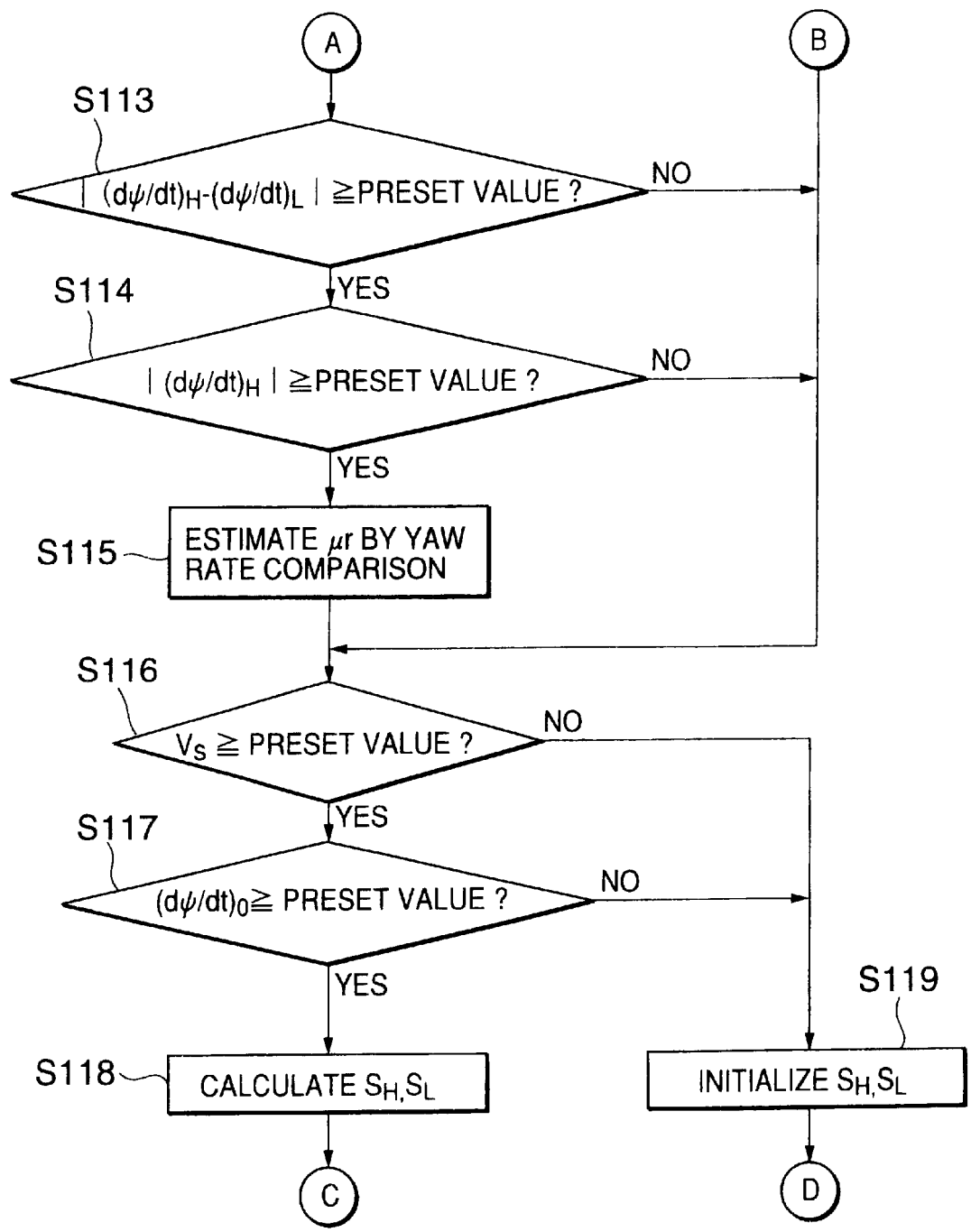
FIG. 7 is a flow chart for road friction coefficient estimation, following the flow chart shown in FIG. 6.

As disclosed in the requirements (1-5), it is determined whether the absolute value of the difference between the high and low μ-road reference yar rates $(dψ/dt)_H$ and $(dψ/dt)_L$ is equal to or larger than a preset value, such as, 1 deg/s, in STEP S113, as shown in FIG. 7.

Moreover, As disclosed in the requirements (1-6), it is determined whether the absolute value of the high μ-road reference yaw rate $(dψ/dt)_H$ is equal to or larger than a preset value, such as, 1 deg/s, in STEP S114.

The process goes to STEP S115 when the requirements for road friction coefficient μγ calculation is met according to the judgement "YES" in all the STEPS S107 to S114.

In STEP S115, the yaw rate comparison μ-estimator 14 estimates and calculates a road friction coefficient μγ by yaw rate comparison. Then, the process goes to STEP S116. Even if at least one of STEPS S107 to S114 judges as "NO", the process jumps onto STEP S116 without calculation in STEP S115.

In STEPS S116 and S117, it is determined whether calculation of a high or a low μ-road side Lissajous figure area $S_H$ or $S_L$ is possible.

In STEP S116, it is determined whether the vehicle speed $V_S$ is equal to or larger a preset value, such as, 10 km/h.

In STEP S117, it is determined whether the basic yaw rate $(dψ/dt)$, is equal to or larger than a preset value, such as, 1.5 deg/s.

If "YES" in both STEPS S116 and S117, it is judged as expecting accurate Lissajous figures, the process then goes to STEP S118.

In STEP S118, the Lissajous figure processor 15 calculates high and low μ-road side Lissajous figure areas $S_H$ and $S_L$. The process then goes to STEPS S120 to S131 for Lissajous figure processing by the Lissajous figure μ-estimator 16.

On the other hand, if "NO" in either or both of STEPS S116 and S117, the process, goes to STEP S119 without obtaining Lissajous figures.

Figure 8:
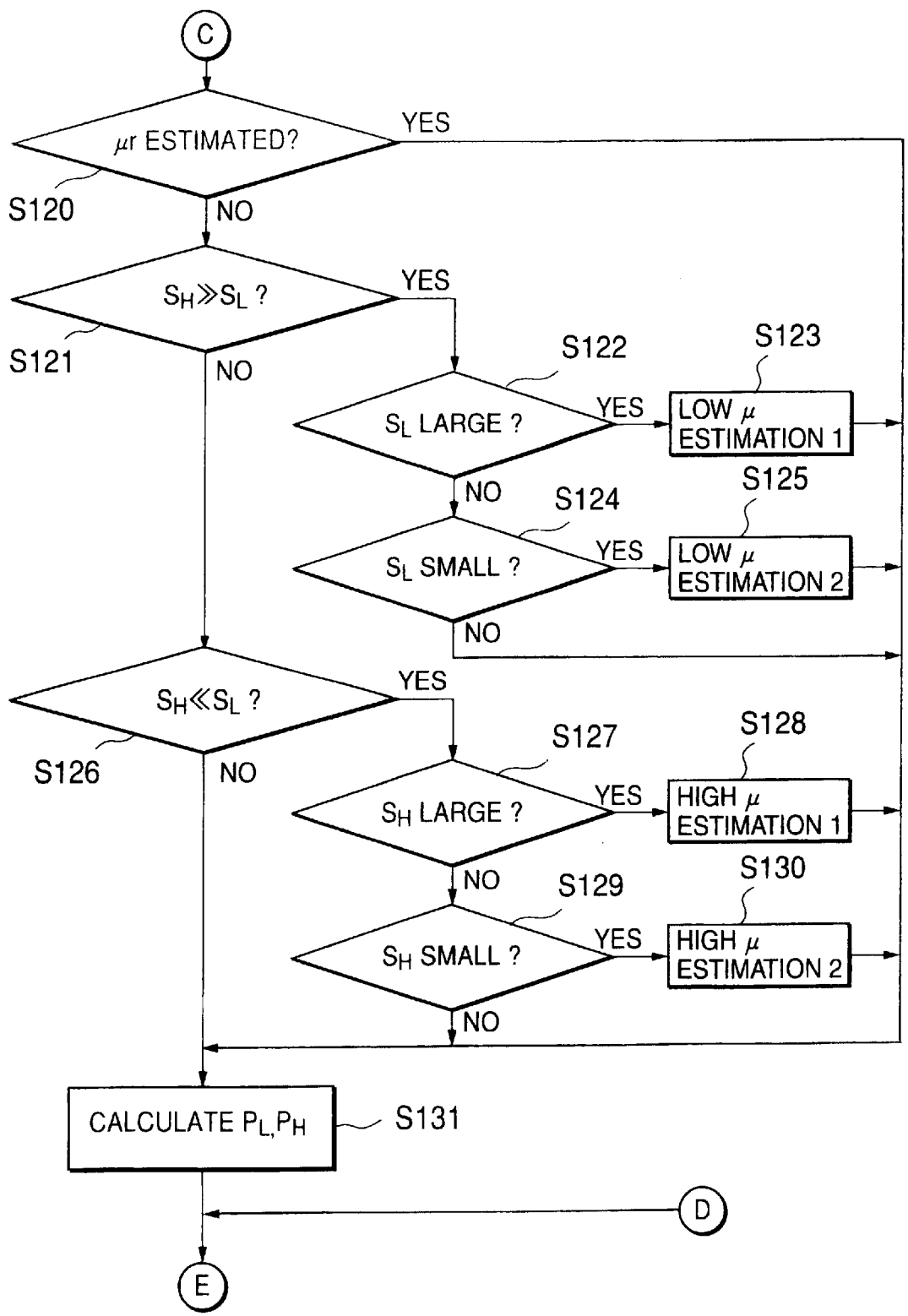
FIG. 8 is a flow chart for road friction coefficient estimation, following the flow chart shown in FIG. 7.

In STEP S119, high and low μ-road side Lissajous figure areas $S_H$ and $S_L$ are initialized and the process jumps onto to STEP S132, as shown in FIG. 8.

When the high and low μ-road side Lissajous figure areas $S_H$ and $S_L$ are calculated in STEP S118, the process goes to STEPS S120 (FIG. 8) where it: is determined whether estimation and calculation of road friction coefficient μγ by yaw rate comparison has been executed in STEP S115.

If "NO", Lissajous figures are used to adjust a road friction coefficient $μ_{n-1}$ that has been estimated, and the process goes to STEP S121 for estimation of the present road friction coefficient $μ_n$.

On the other hand, if "YES" in STEP S120, the process jumps onto STEP S131 without estimation of the present road friction coefficient $μ_n$ by using Lissajous figures.

In STEP S121, it is determined whether the high μ-road side Lissajous figure area $S_H$ is very large compared to the low μ-road side Lissajous figure area $S_L$ (for example, $S_H$>105% of $S_L$)

If "YES" in STEP S121, this means that the present road friction coefficient $μ_n$ is small, and the process goes to STEPS S122 to S125.

In STEP S122, it is determined whether the low μ-road side Lissajous figure area $S_L$ is a large value in a predetermined range. If "YES", it is judged as a large phase delay and low μ-road driving, the process goes to STEP S123 where the road friction coefficient $μ_{n-1}$ that has been estimated so far is adjusted to a small value by a large amount to estimate the present road friction coefficient $μ_n$. The process then goes to STEP S131.

On the other hand, if "NO" in STEP S122, the process goes to STEP S124 where it is determined whether the low μ-road side Lissajous figure area $S_L$ is a small value in a predetermined range. IF "YES", it means there is a high possibility of low μ-road driving, the process goes to STEP S125 where the road friction coefficient $μ_{n-1}$ that has been estimated so far is adjusted to a small value by a small amount to estimate the present road friction coefficient $μ_n$. The process then goes to STEP S131.

On the other hand, if "NO" in STEP S124, the process goes to STEP S131 without estimation of the present road friction coefficient $μ_n$ by using the Lissajous figures.

Furthermore, if "NO" in STEP S121, the process goes to STEP S126 where it is determined whether the high μ-road side Lissajous figure area $S_H$ is very small compared to the low μ-road side Lissajous figure area $S_L$ (for example, 105% of $S_H$<$S_L$).

IF "YES" in STEP S126, it means that the present road friction coefficient $μ_n$ is large, and the process goes to STEPS S127 to S130 for high μ-road Lissajous processing.

In STEP S127, it is determined whether the highs μ-road side Lissajous figure area $S_H$ is a large value in a predetermined range. IF "YES", this means a high possibility of high μ-road driving, the process goes to STEP S128 where the road friction coefficient $μ_{n-1}$ that has been estimated so far is adjusted to a large value by a small amount to estimate the present road friction coefficient $μ_n$. The process then goes to STEP S131.

On the other hand, if "NO" in STEP S127, the process goes to STEP S129 where it is determined whether the high μ-road side Lissajous figure area $S_H$ is a small value in a predetermined range. If "YES", it is judged as a small phase delay and a high possibility of high μ-road driving, the process goes to STEP S130 where the road friction coefficient $μ_{n-1}$ that has been estimated so far is adjusted to a large value by a large amount to estimate the present road friction coefficient $μ_n$. The process then goes to STEP S131.

On the other hand, if "NO" in STEP S129, the process goes to STEP S131 without estimation of the present road friction coefficient $μ_n$ by using Lissajous figures.

In STEP S126, if "NO", the process goes to STEP S131.

In STEP S131, the high and low μ-road side phase components $P_H$ and $P_L$ used in STEP S111 and STEP S136 described later are calculated by using the high or low μ-road side Lissajous figure area $S_H$ or $S_L$.

Figure 9:
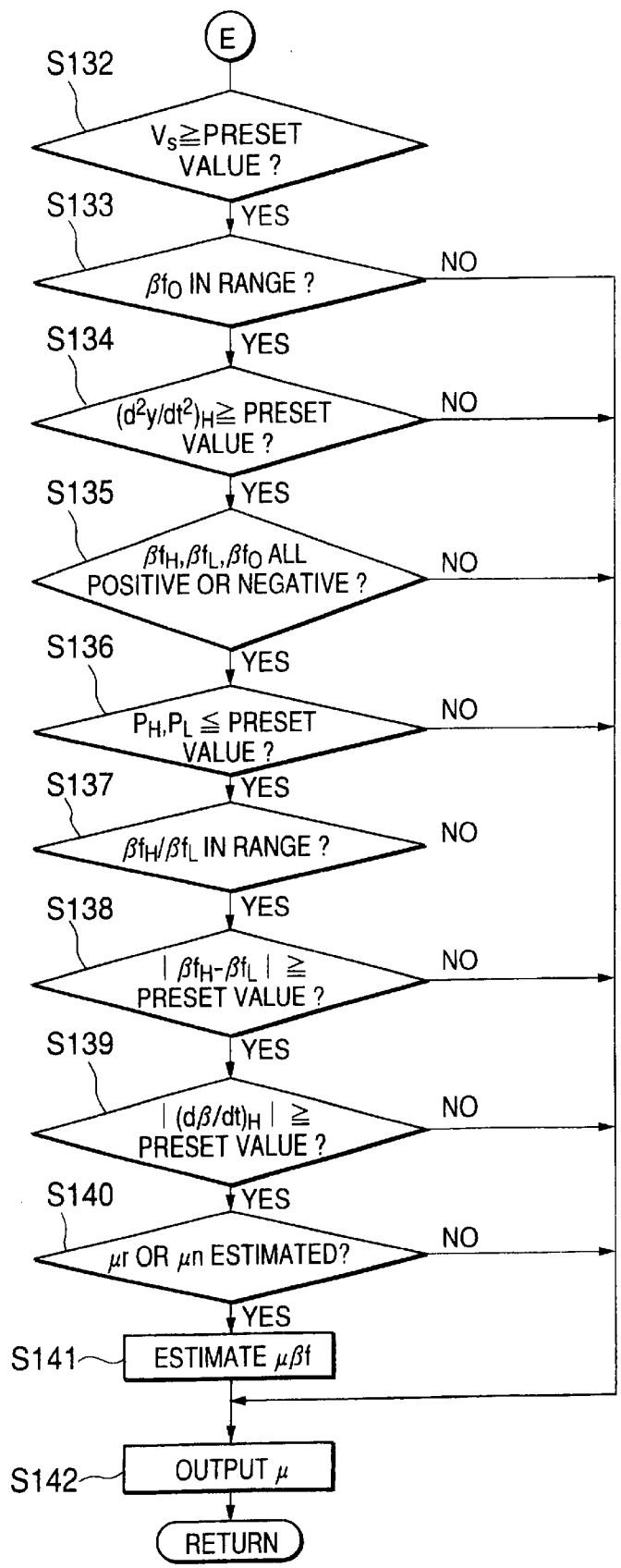
FIG. 9 is a flow chart for road friction coefficient estimation, following the flow chart shown in FIG. 8.

The process goes to STEP S132 shown in FIG. 9. The judging processing in STEPS S132 to S140 is to determine whether the requirements is met for calculating a road friction coefficient μβf by front wheel slip angle comparison in the front wheel slip angle μ-estimator 17.

As disclosed in the requirements (2-1), it is determined in STEP S132 whether a vehicle speed Vs is equal to or higher than a preset value, such as, 30 km/h.

Moreover, as disclosed in the requirements (2-2), it is determined in STEP S133 whether a basic slip angle β$f_O$ is in a range, such as, of 0.5 to 5 deg.

As disclosed in the requirements (2-3), it is determined in STEP S134 whether the absolute value of highs μ-road reference lateral acceleration $(d^2y/dt^2)_H$ is equal to or larger than a preset value, such as, 0.2 G.

Moreover, as disclosed in the requirements(2-4), it is determined in STEP S135 whether the high and low μ-road reference front wheel slip angles $\beta f_H$ and $\beta f_L$, and the basic front wheel slip angle $\beta f_O$ are all positive or negative.

Moreover, as disclosed in the requirements(2-5), it is determined in STEP S136 whether high and low μ-road side phase components $P_H$ and $P_L$ are equal to or smaller than a preset value, such as, 0.06.

Moreover, as disclosed in the requirements(2-6), it is determined in STEP S137 whether a ratio of a high μ-road front wheel slip angle $\mu f_H$ to a low μ-road front wheel slip angle $\mu f_L$ is within a preset range (for example, $\beta f_H/\beta f_L > 1.05$).

Moreover, as disclosed in the requirements(2-7), it is determined in STEP S138 whether the absolute value of the difference between high and low a μ-road reference front wheel slip angles $\beta f_H$ and $\beta f_L$ is smaller than a preset value, such as, 0.1 deg.

Moreover, as disclosed in the requirements (2-8), it is determined in STEP S139 whether the absolute value of a high μ-road reference vehicle slip angular velocity $(d\beta/dt)_H$ is equal to or larger than a preset value, such as, 1 deg/s, for example.

Moreover, as disclosed in the requirements (2-9), it is determined in STEP S140 whether a road friction coefficient $\mu\gamma$ has not been estimated by yaw rate comparison or a road friction coefficient $\mu_n$ has not been estimated by Lissajous figure comparison.

The process goes to STEP S141 when the requirements for road friction coefficient $\mu\beta f$ calculation by front wheel slip angle comparison is met according to the judgement "YES" in all the STEPS S132 to S140.

The front wheel slip angle comparison μ-estimator 17 estimates and calculates a road friction coefficient $\mu\beta f$, and the process goes to STEP S142. Even if at least one of STEPS S132 to S140 judges as "NO", the process jumps onto STEP S142.

In STEP S142, one calculated coefficient among the road friction coefficient $\mu\gamma$ by yaw rate comparison, the road friction coefficient 9n by Lissajous figure comparison and the road friction coefficient $\mu\beta f$ by front wheel slip angle comparison is set as the final road friction coefficient and output by the final μ-estimator 18.

As disclosed, according to the embodiment, a road friction coefficient is obtained based on comparison of a yaw rate estimated by vehicle operating model on high and low friction coefficient-roads and another yaw rate estimated by an observer formed by the vehicle operating model, thus offering precise road friction coefficient calculation with small errors due to disturbances, noises and phase delays, and also cumulative errors due to repeated calculation.

Furthermore, road friction coefficient calculation by yaw rate comparison estimates a road friction coefficient by comparing delays in yaw rate using Lissajous figures drawn with yaw rates when there is a large error due to delays in yaw rate to inputs, thus offering precise road friction coefficient estimation in a vehicle operating range in which yaw rates will be delayed to inputs.

Moreover, this embodiment offers precise road friction coefficient estimation by using front wheel slip angles closely connected to generation of cornering forces even in a vehicle operating range to which road friction coefficients by yaw rate or Lissajous figure comparison cannot be applied.

According to the present invention, a friction coefficient on road is estimated as follows:

An actual value of a specific vehicle operating parameter is calculated. A first reference value of the vehicle operating parameter on a road with a large friction coefficient is calculated based on vehicle operating model for the road with the large friction coefficient. A second reference value of the vehicle operating parameter on a road with a small friction coefficient is calculated based on vehicle operating model for the road with the small friction coefficient. A friction coefficient on road is estimated based on the relationship between the actual value and the first and the second reference values.

This estimation offers precise road friction coefficient estimation with small errors due to disturbances, noises and phase delays, and also cumulative errors due to repeated calculation.

Furthermore, according to the present invention, a first Lissajous figure is formed based on the actual value and the first reference value and an area of the first Lissajous figure for the road with the large friction coefficient is calculated, and also a second Lissajous figure is formed based on the actual value and the second reference value and an area of the second Lissajous figure for the road with the small friction coefficient is calculated. The friction coefficient is adjusted based on the relationship between the friction coefficient and the areas of the first and the second Lissajous figures which vary in response to delay in vehicle operating parameter, thus the adjustment offering precise road friction estimation in a wide range.

Moreover, according to the present invention, a friction coefficient on road can be estimated as follows:

An actual value of yaw rate or lateral acceleration and another actual value of a front wheel slip angle are calculated.

Calculated next are a first reference value of the yaw rate or the lateral acceleration and a second reference value of the front wheel slip angle on a road with a large friction coefficient based on vehicle operating model for the road with the large friction coefficient.

Calculated further are a third reference value of the yaw rate or the lateral acceleration and a fourth reference value of the front wheel slip angle on a road with a small friction coefficient based on vehicle operating model for the road with the small friction coefficient.

Estimated are a first friction coefficient on road based on the relationship between the actual value and the first reference value on the road with the large friction coefficient and the third reference value on the road with the small friction coefficient, and a second friction coefficient on road based on the relationship between the actual value and the second reference value on the road with the large friction coefficient and the fourth reference value on the road with the small friction coefficient.

Either the first or the second friction coefficient is employed according to predetermined requirements, thus this estimation offering precise road friction coefficient in a wide range by using a front wheel slip angle which is closely connected to cornering forces.

What is claimed is:

1. An apparatus for estimating a friction coefficient on a road for vehicles, the apparatus comprising:

a vehicle operating parameter calculator to calculate a vehicle operating parameter based on vehicle operating conditions;

a basic parameter calculator to calculate a basic parameter by inputting the vehicle operating parameter into a vehicle operating model;

a first reference value calculator to calculate a first reference value by inputting the vehicle operating parameter into said vehicle operating model for the road with the large friction coefficient;

a second reference value calculator to calculate a second reference value by inputting the vehicle operating parameter into said vehicle operating model for the road with the small friction coefficient; and an estimator to estimate a friction coefficient on road based on the basic parameter, the first reference value and the second reference value.

2. The apparatus according to claim 1, wherein the vehicle operating parameter includes at least one of yaw rate and lateral acceleration.

3. The apparatus according to claim 2, wherein said estimator estimates the friction coefficient on a road based on the basic parameter of the yaw rate, the first reference value of the yaw rate and the second reference value of the yaw rate when the vehicle operating condition satisfies a first predetermnined requirement.

4. The apparatus according to claim 2, wherein said estimator estimates the friction coefficient on a road based on the basic parameter of the lateral acceleration, the first reference value of the lateral acceleration and the second reference value of the lateral acceleration when the vehicle operating condition satisfies a first predetermnined requirement.

5. The apparatus according to claim 1, wherein the basic parameter calculator forms an observer by the vehicle operating model to estimate the vehicle operating parameter as a basic parameter with feeding back of actual vehicle movements.

6. The apparatus according to claim 1, further comprising:

an adjuster to form a first Lissajous figure based on the basic parameter and the first reference value to calculate an area of the first Lissajous figure for the road with the large friction coefficient, and a second Lissaous figure based on the basic parameter and the second reference value to calculate an area of the second Lissajous figure for the road with the small friction coefficient, and to adjust the friction coefficient based on a previously calculated friction coefficient and the areas of the first and the second Lissajous figures.

7. The apparatus according to claim 6, wherein said estimator estimates the friction coefficient on a road based on the basic parameter of yaw rate, the first reference value of the yaw rate and the second reference value of the yaw rate when the vehicle operating condition satisfies a first predeterm.

8. The apparatus according to claim 4, wherein said estimator estimates the friction coefficient on a road based on the basic parameter of front wheel slip angle, the first reference value of the front wheel slip angle and the second reference value of front wheel slip angle when the vehicle operating condition satisfies a second predetermined requirement.

9. The apparatus according to claim 8, wherein said estimator estimates the friction coefficient on a road based on the previously calculated friction coefficient and area of the first and the second Lissajous figures.

10. The apparatus according to claim 1, wherein said estimator estimates the friction coefficient on a road based on the basic parameter of front wheel slip angle, the first reference value of the front wheel slip angle and the second reference value of front wheel slip angle when the vehicle operating condition satisfies a second predetermined requirement.

11. An apparatus for estimating a friction coefficient on road for vehicles, the apparatus comprising:

a vehicle operating parameter calculator to calculate a vehicle operating parameter based on vehicle operating conditions;

a basic parameter calculator to calculate a basic parameter of one of yaw rate and lateral acceleration and another actual value of a front wheel slip angle;

a first reference value calculator to calculate a first reference value of one of the yaw rate and the lateral acceleration and a second reference value of the front wheel slip angle on a road with a large friction coefficient based on a vehicle operating model for the road with the large friction coefficient;

a second reference value calculator to calculate a third reference value of one of the yaw rate and the lateral acceleration and a fourth reference value of the front wheel slip angle on a road with a small friction coefficient based on a vehicle operating model for the road with the small friction coefficient; and an estimator to estimate a first friction coefficient for a road based on the basic parameter and the first reference value on the road with the large friction coefficient and the third reference value on the road with the small fiction coefficient, and a second friction coefficient for a road based on the basic parameter and the second reference value on the road with the large friction coefficient and the fourth reference value on the road with the small fiction coefficient, either the first or the second fiction coefficient being employed according to predetermined requirements.

12. An apparatus for estimating friction coefficients on a road for vehicles, the apparatus comprising:

a vehicle operating parameter calculator to calculate a vehicle operating parameter based on vehicle operating conditions;

a basic parameter calculator to calculate a basic parameter of a front wheel slip angle;

a first reference value calculator to calculate a first reference value of a front wheel slip angle on a road with a large friction coefficient based on a vehicle operating model for the road with the large friction coefficient;

a second reference value calculator to calculate a second reference value of the front wheel slip angle on a road with a small friction coefficient based on a vehicle operating model for the road with the small friction coefficient; and an estimator to estimate a friction coefficient on road based on the basic parameter and the first reference value and the second reference value.

* * * * *